United States Patent [19]
Roddy et al.

[11] Patent Number: 6,127,740
[45] Date of Patent: Oct. 3, 2000

[54] SYSTEM FOR CONTROLLING SIGNAL STRENGTH IN A REMOTE TRANSMITTER

[75] Inventors: Timothy S. Roddy, Plymouth; Philip LeMay, Ann Arbor, both of Mich.

[73] Assignee: Lear Corporation, Dearborn, Mich.

[21] Appl. No.: 09/322,839

[22] Filed: May 28, 1999

[51] Int. Cl.$^7$ .................................................. B60L 1/00
[52] U.S. Cl. ...................... 307/10.1; 307/125; 307/139
[58] Field of Search .................... 307/10.2, 10.1, 307/10.5, 116, 125, 129, 139; 180/287; 340/426, 525, 825.32, 825.71, 825.72, 825.69, 825.3, 825.31, 825.44, 825.54, 825.5; 455/127

[56] References Cited

U.S. PATENT DOCUMENTS

| | | | |
|---|---|---|---|
| 4,023,138 | 5/1977 | Ballin | 340/64 |
| 5,648,764 | 7/1997 | Nose et al. | 340/825.32 |
| 5,731,756 | 3/1998 | Roddy . | |
| 5,758,269 | 5/1998 | Wu | 455/127 |
| 5,783,994 | 7/1998 | Koopman, Jr. et al. | 340/539 |
| 5,973,412 | 10/1999 | Nantz et al. | 307/10.5 |

Primary Examiner—Stephen W. Jackson
Assistant Examiner—Sharon Polk
Attorney, Agent, or Firm—Brooks & Kushman P.C.

[57] ABSTRACT

A system for controlling power in a remote signalling device includes an electronic controller, a transmitter portion and a signal conditioning portion. The electronic controller preferably determines the characteristics of the desired transmitted signal and provides information regarding those characteristics to the transmitter portion. The electronic controller also provides a power control signal to the transmitter portion. The controller determines the characteristics of the power control signal depending on the characteristics of the desired transmitted signal and other preselected factors. The power control signal preferably is processed by the signal conditioning portion so that it provides the desired voltage to the transmitter portion. The power control signal regulates the signal strength from the transmitter portion so that more consistent and effective communications are provided to accommodate a variety of transmitted signals and varying operating conditions over the life of the remote signalling device.

14 Claims, 1 Drawing Sheet

SYSTEM FOR CONTROLLING SIGNAL STRENGTH IN A REMOTE TRANSMITTER

BACKGROUND OF THE INVENTION

This invention generally relates to remote signalling devices used, in vehicle security systems for example and, more particularly, to a system for controlling the strength of a signal transmitted by the remote signalling device.

A variety of remote signalling devices are commercially available. Examples include garage door opener systems, home security lighting systems, estate gate opening systems and vehicle security and alarm systems. In most cases, these systems include a portable, low power, radio frequency transmitter. Even though a wide variety of such devices are commercially available, those skilled in the art are always striving to make improvements and there is a need for enhanced and improved capability.

For example, a recent trend includes incorporating the ability to remotely communicate with a variety of devices from a single remote signalling transmitter. It is useful for a vehicle owner, for example, to be able to use a single transmitter to remotely operate a vehicle security system and a garage door opener using a single transmitter. Utilizing individual transmitters for multiple systems is cumbersome and inconvenient.

When one tries to incorporate different transmitter circuits into a single transmitter to accommodate the different signals for the different systems, several difficulties are encountered. One problem is associated with cost and "universal" application for a transmitter. When individual transmitter circuits are utilized, the cost typically increases for each signalling device. Moreover, even where individual transmitter circuits are utilized, fixed signal levels from the transmitter cannot be optimized for differing modulation duty cycles of the various transmissions that may need to be generated. An additional challenge that is presented is that the carrier frequency and modulation duty cycle of the ultimate signals to be transmitted are typically not known to the manufacturer, which can make it challenging to design circuitry that will accommodate all of the signals that a particular consumer desires.

Another problem that is typically faced with remote signalling devices is that the battery or power source supply voltage typically decreases during the normal lifetime of the signalling device. A decreasing supply voltage usually results in a reduced signal strength. Over time, therefore, most remote signalling devices become ineffective for communicating with the desired system controller.

Another consideration is complying with regulatory limits. Limitations on signal levels poses another challenge that must be overcome when trying to adjust signal strength to optimize performance.

This invention provides a solution to the difficulties faced in designing such a remote signalling device. Moreover, this invention has usefulness in all remote signalling devices where power management can enhance the performance of the signalling device.

SUMMARY OF THE INVENTION

In general terms, this invention is a system for controlling the signal strength from a remote signalling device. The remote signalling device includes a controller and a transmitter portion. The controller provides information to the transmitter portion that indicates the content of the signal that should be transmitted from the remote signalling device. The controller also preferably determines characteristics of the signal to be transmitted. The controller also provides a power control signal to the transmitter portion so that the strength of the signal generated by the transmitter portion is maintained within a selected range.

In the preferred embodiment, a signal conditioning circuit processes the power control signal from the controller to provide a voltage to the transmitter portion. The conditioned power control signal preferably provides a specific voltage to the transmitter portion to maintain a desired signal strength for a transmitted signal that takes into account the modulation duty cycle or operation frequency. Additionally, the power control signal is utilized to adapt the transmitted signal strength responsive to decreases in a power supply voltage associated with the remote signalling device.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
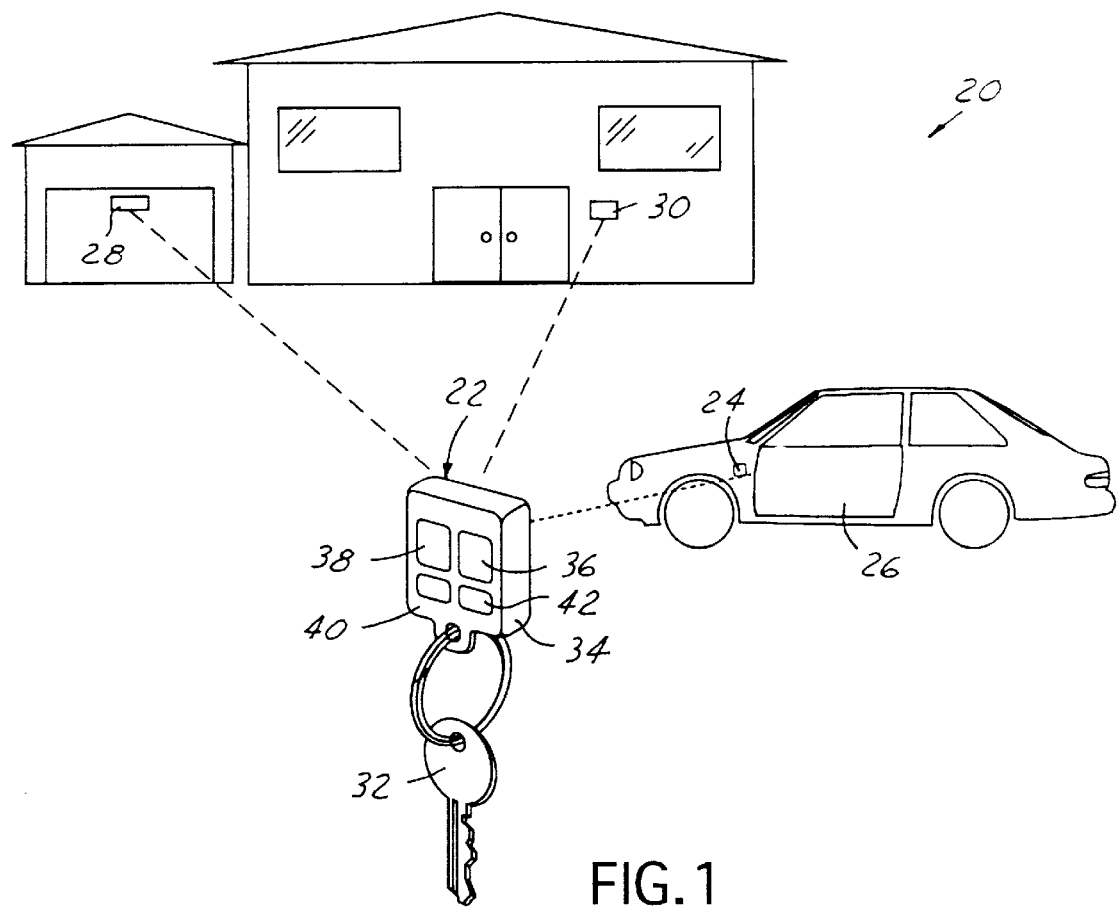
FIG. 1 diagrammatically illustrates a system designed according to this invention.

FIG. 1 diagrammatically illustrates a remote communication system 20 that includes a remote signalling device 22. In the illustrated embodiment, the remote signalling device 22 provides the capability of communicating with a controller 24 of a vehicle security system on a vehicle 26. The remote signalling device 22 also allows communication with a garage door opener 28 and a home security system controller 30. The vehicle security system, garage door opener and home security system can be any of a variety of commercially available systems that provide for remote communication to operate the system.

The remote signalling device 22 is illustrated as a key fob that is typically used to carry about a key 32 for operating the vehicle 26, for example. The key fob includes a housing 34 and a plurality of manually operable switches 36, 38, 40 and 42. Depending on which of the switches is operated by an individual, the signalling device communicates with a specific system. In the illustrated embodiment, for example, utilizing the switch 36 causes the remote signalling device 22 to send a signal to the home security system controller 30, the switch 38 causes a signal to be generated to communicate with the garage door opener 28, and the switches 40 and 42 are utilized to operate the vehicle security system and a door lock feature, respectively.

Although the remote signalling device in the illustrated example is in a key fob, other arrangements are possible. For example, the remote signalling device can be mounted in the headliner of a vehicle.

Figure 2:
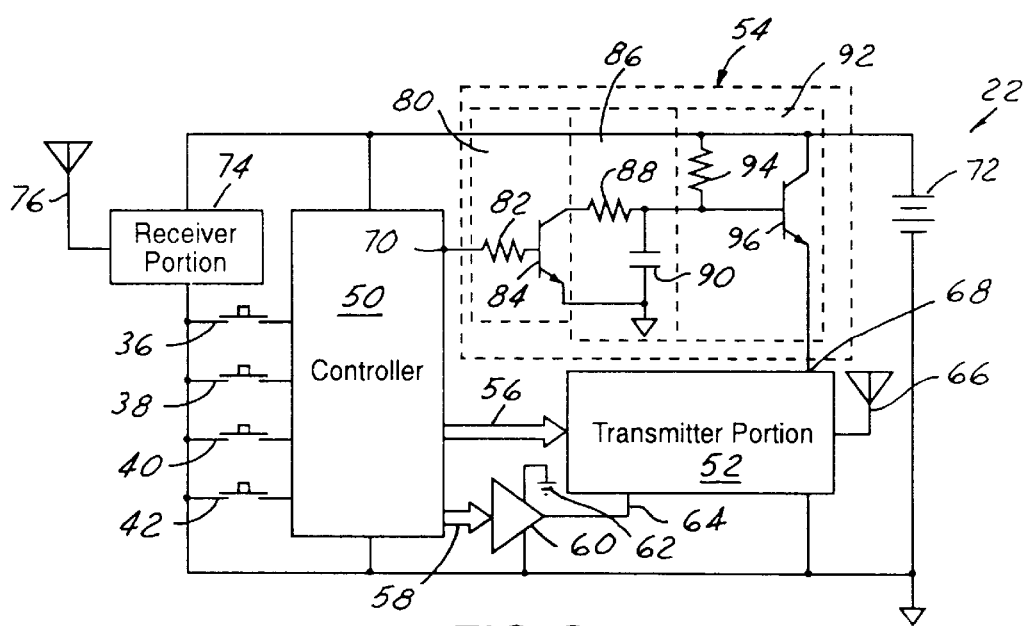
FIG. 2 schematically illustrates more details of a power control system designed according to this invention.

FIG. 2 schematically illustrates a preferred embodiment of the remote signalling device 22. A controller 50 provides signal information to a transmitter portion 52 responsive to a user operating one of the switches 36–42. The remote signalling device 22 also includes a signal conditioning portion 54.

The controller 50 provides signal content information over a communication link 56. The signal information can take any conventional form depending on the needs of the desired communication. For example, a rolling code algorithm may be programmed into the controller 50 to provide secure communication between the remote signalling device 22 and the various controllers 24, 28 and 30.

The controller 50 preferably also determines a frequency characteristic required for the signal to be transmitted by the transmitter portion 52. The frequency characteristic information is typically provided over the signal paths schematically illustrated at 56 and 58 using any of the following methods. A first method uses a tunable broadband RF oscillator as the transmitter 52. A digital-to-analog converter 60 and voltage source 62 (connected to battery 72) are utilized to provide a tune voltage to the oscillator in the transmitter portion 52 along signal path 64. In another method, the transmitter portion 52 includes several fixed-frequency RF oscillator channels. The controller 50 determines the frequency by selecting the appropriate signal path to the desired oscillator channel from individual signal paths in the communication link 56. A combination of these methods could employ several tunable oscillator channels each capable of operating over specific frequency ranges. Additional combinations of these and other frequency selection and tuning methods may be apparent to those skilled in the art. The transmitter portion 52 transmits the ultimate signal through the antenna 66.

A power control signal, which preferably is a pulse-width-modulated voltage signal, is generated by the controller 50 and preferably is provided at an output 70. The power control signal effectively provides a selectively varied voltage at 68 to the transmitter portion 52 to maintain a desired signal strength or power output from the transmitter portion 52. The variable voltage level at 68 is utilized to accommodate variations in the characteristics of the desired transmitted signal. Example characteristics that preferably are accommodated by the power control signal include various modulation duty cycles, operating at a variety of frequencies, and changes in a supply voltage from a battery 72. In other words, the power control signal provided by the controller 50 through the output 70 provides transmitted signal strength adjustments according to the characteristics of the signal to be transmitted by the transmitter portion 52. Additionally, since the operating frequency of some oscillator types may be shifted by changes in the operating voltage, the controller 50 may implement compensation or correction factors in the frequency tune signal 58, to assure accuracy of the oscillator frequency for various operating voltages at 68.

In another example, the power control signal is an analog signal having a voltage that is varied to meet the requirements of a particular situation. In this type of arrangement, an amplifier preferably provides sufficient current at the desired voltage level so that the power control signal is effective to control the power output or signal strength of the transmitter portion 52.

The remote signalling device 22 most preferably is a trainable transceiver and, therefore, includes a receiver portion 74 and an antenna 76 for receiving signals from other transmitters as is known in the art. The controller 50 preferably processes signals gathered by the receiver portion 74 and then duplicates the necessary signal characteristics to allow the signal transmitter portion 52 to generate signals corresponding to the various signals gathered by the receiver portion 74. An example way of teaching the controller 50 the various signals to be transmitted includes utilizing the separate remote signalling device for the garage door opener 28 and the home security system 30 to generate their normal signals so that they are received by the receiver portion 74. The characteristics of those signals are then processed and later duplicated by the controller 50 so that the single remote signalling device 22 is capable of communicating with the various devices.

Although the illustrated embodiment includes the ability to communicate with multiple systems, this invention is equally applicable to remote signalling devices that are dedicated to a single system where transmitted signal strength management is useful.

The power control signal provided by the controller 50 through the output 70 preferably is processed by a signal conditioning portion 54 to provide the preferred voltage level to the transmitter portion 52 at 68. In the illustrated embodiment, the circuit conditioning portion 54 includes a level shift inverter circuit 80, which consists of a resistor 82 and a transistor 84. A voltage averaging circuit 86 includes a resistor 88 and capacitor 90. A voltage regulator portion 92 includes a bias resistor 94 and a transistor 96. Given this description, those skilled in the art will be able to choose from commercially available components and to select appropriate values or characteristics for the illustrated components.

The power control signal provided by the controller 50 preferably is a voltage control signal that is pulse width modulated. The controller 50 preferably is a commercially available microprocessor. Given this description, those skilled in the art will understand how to program a microprocessor to realize the various functions of the controller.

The power control signal preferably is dependent on a variety of circuit parameters or conditions and the frequency and modulation of the signal to be transmitted by the transmitter portion 52. Example circuit parameters or conditions that are accounted for preferably include non-linearities of the averaging and regulator circuits and frequency-dependent path losses of the transmitter and antenna designs. Such conditions preferably are factored into the power control signal derivation by utilizing fixed values or offset values that preferably are determined during the design phase of the remote signalling device 22. The controller 50 preferably is programmed to account for other adjustment factors or offsets that are realized through testing or calibration procedures.

The controller 50 preferably is programmed to determine the necessary power control signal by analyzing the modulation of the desired signal that is to be transmitted by the transmitter portion 52. The controller 50 preferably determines the average duty cycle of the desired transmitted signal. The carrier frequency of the intended transmission, which preferably is previously preprogrammed into the controller 50, is then utilized with the determined average duty cycle and the other fixed values and offsets to determine a proper power control signal duty cycle for adjusting the signal strength of the transmitted signal. Determining the necessary characteristics of the power control signal is accomplished, in one example, by utilizing a prestored look up table that is programmed into a memory portion of the controller 50. In another example, mathematical formulas are utilized by the controller 50 to determine the duty cycle of the power control signal based upon the determined signal and circuit factors.

In the preferred embodiment, the power control signal is provided through the output 70 before the actual radio frequency transmission from the transmitter portion 52 occurs. Providing the power control signal early allows the signal conditioning portion 54 to perform its intended function as follows.

In situations where maximum signal strength is desired, the power control signal preferably is maintained unmodulated at a low logic state, which provides minimum power control signal voltage. The level shift inverter transistor 84, therefore, is biased to an "off" state. This condition permits the averaging circuit 86 to be fully charged through the regulator bias resistor 94, which provides maximum voltage at the base of the regulator transistor 96. Under these conditions, the emitter of the voltage regulator transistor 96 is also at a maximum voltage, which provides maximum power to the transmitter portion 52.

As the voltage control signal is modulated (i.e., pulsed to a logic high state), the averaging circuit 86 is discharged by the inverter circuit 80 according to the duty cycle of the power control signal provided by the controller 50. This decreases the voltage at the base and emitter of the regulator transistor 96, therefore, reducing the voltage available to the transmitter portion 52.

Given this description, those skilled in the art will be able to choose from commercially available components and/or to custom design circuitry and software to arrive at the intended results provided by this invention. It is important to note that an example implementation is shown in FIG. 2. Variations are possible, such as eliminating the level shift inverter 80 in situations where the maximum transmitter voltage is nearly equal to the maximum power control signal voltage. Further, it may be possible in some situations to incorporate the signal conditioning portion 54 into the internal workings of the controller 50.

The preferred embodiment of the controller 50 includes the capability to account for other factors that affect transmitted signal strength. For example, battery level detection preferably is included that allows maximum signal strength at a voltage below the nominal battery voltage. In one example, the power control signal causes a reduction in voltage to the transmitter portion 52 when the battery 72 is at full power to effectively reduce the signal level from the transmitter portion 52. Over time, as the battery 72 voltage decreases, the duty cycle of the power control signal preferably is reduced to maintain full signal strength from the transmitter portion 52.

In another example, temperature compensation is factored into the signal strength control to accommodate variations in performance of the different components of the remote signalling device 22, which are affected by variations in temperature. Further, the controller 50 preferably is programmed to accommodate different functional signal strength adjustments to provide selected performance under different conditions such as within manufacturing or testing environments or providing increased signal strength for personal security or transmissions that are intended to enhance an individual's personal safety.

This invention provides a system for managing signal strength from a remote signalling device. A system designed according to this invention is especially useful for "universal" type transmitters to accommodate variations in multiple signals while providing consistent results in the desired signal strength. Additionally, a system designed according to this invention is useful in all remote signalling devices that have signal strength management concerns, which can be caused by such phenomena as manufacturing variations, component tolerances and varying power supply conditions.

The description just given is exemplary rather than limiting in nature. Variations and modifications may become apparent to those skilled in the art that do not necessarily depart from the purview and spirit of this invention. The scope of legal protection given to this invention can only be determined by studying the following claims.

What is claimed is:

1. A system for controlling the signal strength from a remote signalling device, comprising:

an electronic controller;

a transmitter portion that transmits a signal from the remote signalling device to a remotely located system controller; and a signal conditioning circuit coupled between the electronic controller and the transmitter portion;

wherein the electronic controller provides information to the transmitter portion that indicates the content of the signal that is to be transmitted from the remote signalling device, the electronic controller determines a frequency characteristic of the signal to be transmitted, and the electronic controller provides a power control signal to the transmitter portion that corresponds to the determined frequency characteristic and maintains a strength of the transmitted signal within a selected range dependent upon characteristics of the transmitted signal, wherein the signal conditioning circuit processes the power control signal from the electronic controller and provides a desired voltage to the transmitter portion.

2. The system of claim 1, wherein the electronic controller has a first output for communicating the signal information to the transmitter portion and a second output for communicating the power control signal to the conditioning circuit and the transmitter portion has a first input for receiving the signal information and a second input coupled to the conditioning circuit for receiving the processed power control signal voltage.

3. The system of claim 2, wherein the signal conditioning circuit comprises a voltage averaging circuit portion and a voltage regulator circuit portion and wherein the power control signal is processed by the voltage averaging circuit portion before it is processed by the voltage regulator circuit portion.

4. The system of claim 3, wherein the signal conditioning circuit further comprises a level shift inverter circuit coupled between the voltage averaging circuit portion and the second output of the electronic controller.

5. The system of claim 1, wherein the electronic controller provides the power control signal to the signal conditioning circuit before it provides the signal information to the transmitter portion.

6. The system of claim 2, wherein the power control signal provides a selected voltage value to the transmitter portion.

7. The system of claim 6, wherein the characteristic determined by the electronic controller is at least one of a modulation duty cycle or operation frequency of the signal to be transmitted.

8. The system of claim 2, further comprising a plurality of user-activatable switches and wherein the electronic controller determines the signal information and a value of the power control signal responsive to which one of the switches is activated by the user.

9. The system of claim 2, further comprising a receiver portion that receives at least one transmitted signal from another device and wherein the electronic controller processes the received signal and subsequently provides signal information to the transmitter portion such that the transmitted signal from the transmitter portion corresponds to the received signal.

10. A system for controlling the signal strength from a remote signalling device, comprising:

an electronic controller;

a transmitter portion that transmits a signal from the remote signalling device to a remotely located system controller; and a battery power source that supplies power to the transmitter portion;

wherein the electronic controller provides information to the transmitter portion that indicates the content of the signal that is to be transmitted from the remote signalling device, the electronic controller determines a frequency characteristic of the signal to be transmitted, and the electronic controller provides a power control signal to the transmitter portion that corresponds to the determined frequency characteristic and maintains a strength of the transmitted signal within a selected range dependent upon characteristics of the transmitted signal, and wherein the electronic controller determines a value of the power control signal responsive to decreases in a voltage of the power source.

11. A remote signalling system for communicating with at least one remotely located system controller, comprising:

a housing;

a plurality of switches that are supported by the housing and are selectively activated by a user of the signalling device;

a transmitter portion that is supported by the housing and transmits a signal from the remote signalling device to a remotely located system controller;

an electronic controller that is supported by the housing and provides information to the transmitter portion that indicates the content of the signal that is to be transmitted from the remote signalling device responsive to activation of at least one of the switches, the electronic controller also determining a frequency characteristic of the signal to be transmitted and providing a power control signal to the transmitter portion that corresponds to the determined frequency characteristic and maintains a strength of the transmitted signal within a selected range dependent upon characteristics of the transmitted signal; and a signal conditioning circuit coupled between the electronic controller and the transmitter portion that processes the power control signal from the electronic controller and provides a desired voltage to the transmitter portion.

12. The system of claim 11, wherein the electronic controller comprises a microprocessor that has a first output for communicating the signal information to the transmitter portion and a second output for communicating the power control signal to the conditioning circuit and the transmitter portion has a first input for receiving the signal information and a second input coupled to the conditioning circuit for receiving the processed power control signal voltage.

13. The system of claim 12, wherein the signal conditioning circuit comprises a voltage averaging circuit portion and a voltage regulator circuit portion and wherein the power control signal is processed by the voltage averaging circuit portion before it is processed by the voltage regulator circuit portion.

14. The system of claim 13, wherein the signal conditioning circuit further comprises a level shift inverter circuit coupled between the voltage averaging circuit portion and the second output of the electronic controller.

* * * * *